No. 883,136. PATENTED MAR. 24, 1908.
H. P. JOHNSON.
MOWING MACHINE.
APPLICATION FILED JUNE 13, 1907.
2 SHEETS—SHEET 1.
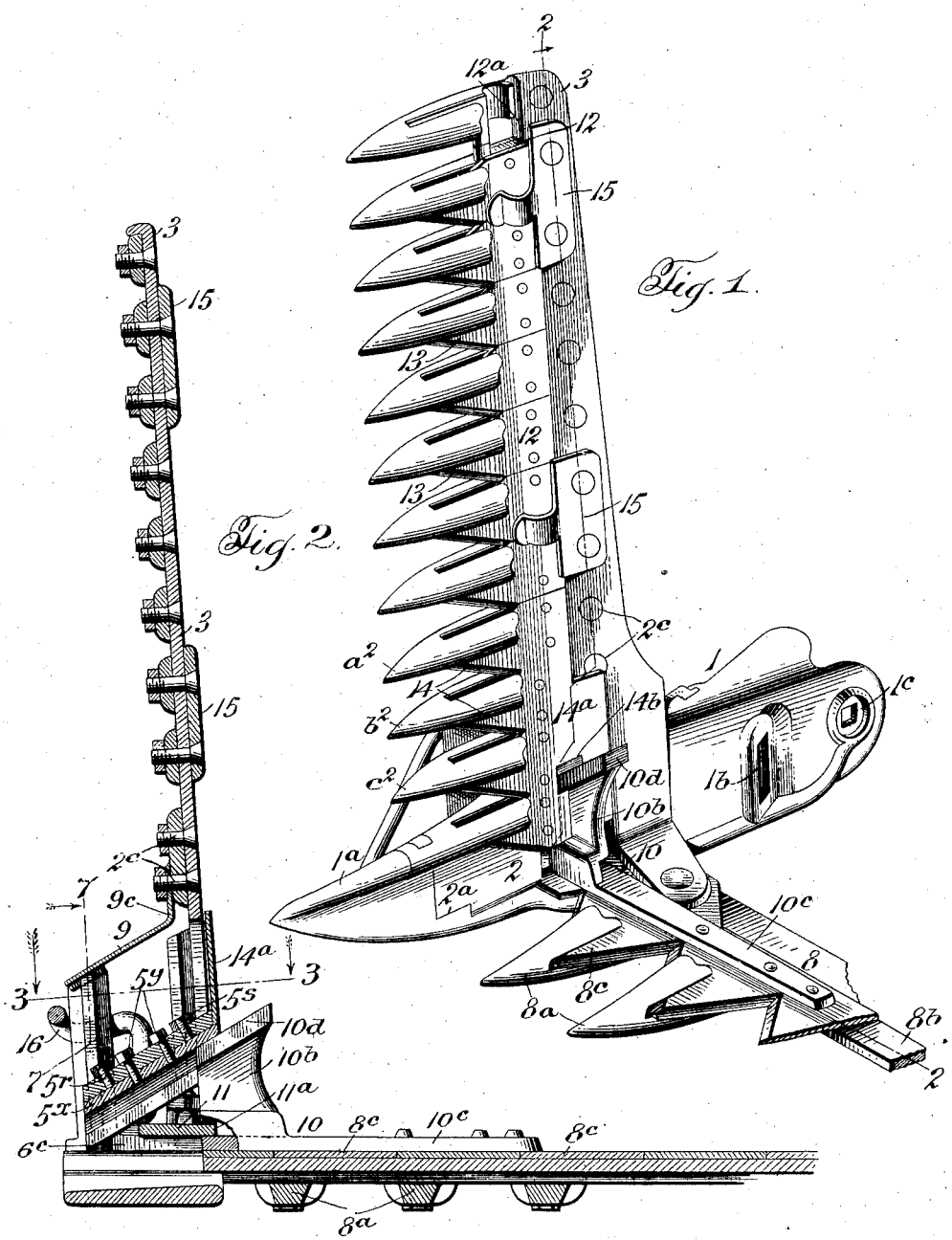

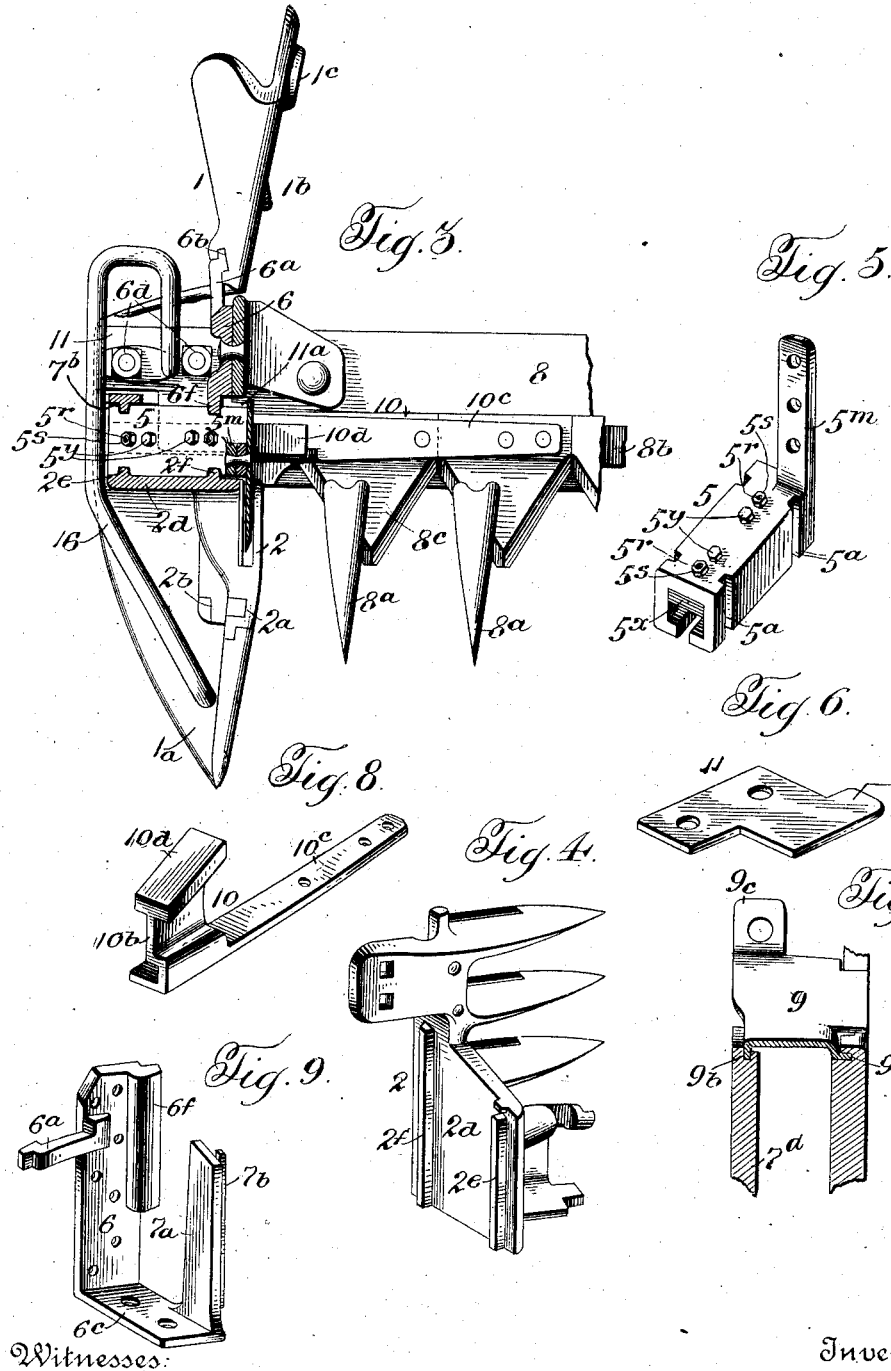

UNITED STATES PATENT OFFICE.

HENRY P. JOHNSON, OF TERRE HAUTE, INDIANA, ASSIGNOR OF ONE-HALF TO JAMES E. THOMAS, OF TERRE HAUTE, INDIANA.

MOWING-MACHINE.

No. 883,136.  Specification of Letters Patent.  Patented March 24, 1908.

Application filed June 13, 1907. Serial No. 378,768.

*To all whom it may concern:*

Be it known that I, HENRY P. JOHNSON, residing at Terre Haute, in the county of Vigo and State of Indiana, have invented certain new and useful Improvements in Mowing-Machines, of which the following is a specification.

My invention, which generally relates to improvements in mowing machines, more particularly is in the nature of a supplemental cutting mechanism, adapted to coöperate with the main sickle bar and specially arranged intermediate connections joining the two cutter mechanisms, whereby to provide a simple, economical and easily applied and effectively operating attachment for the ordinary types of mowing machines, especially adapted for cutting pea-vines, clover and tangled grass vertically, to divide the swaths made by the mower.

My invention especially seeks to provide a simple and effective construction of parts for joining the vertically reciprocable sickle bar with the horizontal or main sickle bar, in which the use of link or toggle members is dispensed with, and a direct transmission of the horizontal reciprocal motion of the main cutter is imparted to the vertically movable cutter, in a positive manner and with a minimum amount of friction.

My invention also embodies certain novel and detail arrangement of parts, all of which will be first fully described, and then specifically pointed out in the appended claims, reference being had to the accompanying drawings, in which—

Figure 1, is a perspective view of my invention. Fig. 2, is a vertical, longitudinal section of my invention taken on the broken line 2—2 of Fig. 1. Fig. 3, is a horizontal section on the line 3—3 of Fig. 2. Fig. 4, is a detail view of one section of my apparatus showing one of the vertical slide carrying members and the guard fingers which are carried thereby. Fig. 5, is a detail perspective view of the vertical sickle bar carried sliding bearing member. Fig. 6, is a detail perspective view of the lower sickle bar retaining plate. Fig. 7, is a detail, vertical, cross section on the line 7—7 of Fig. 2. Fig. 8, is a detail perspective view of the lower sickle bar carried sliding incline bearing member. Fig. 9, is a detail perspective view of the plate 6.

Referring now to the accompanying drawings in which like letters and numerals of reference indicate like parts in all of the figures, it will be noticed that 1 designates the shoe which is to be substituted on the mowing machine for the ordinary type of shoe used thereon, and the shoe 1 includes the shoe peak $1^a$, and the securing slot and aperture $1^b$—$1^c$ respectively, which may be of the ordinary type.

Secured to the shoe and forming a coöperative part therewith is the lower section 2 of the vertical sickle bar and this section 2 is interlocked as at $2^a$ and $2^b$ with the shoe 1, and is furthermore bolted at $2^c$ to the vertical supporting bar 3, as shown. The section 2 includes guards $a^2$, $b^2$, $c^2$, which are integrally formed therewith, and an extended wing $2^d$ which carries a pair of slide-ways $2^e$, $2^f$ on one face thereof. These slide-ways coöperate with the vertically sliding bearing block 5 hereinafter referred to.

6 designates a plate riveted or otherwise secured to the vertical supporting bar 3 and having an arm $6^a$ interlocked at $6^b$ with the shoe 1, and the plate 6 has a foot $6^c$ which is bolted to the shoe by bolts $6^d$, as shown. The plate 6 is also provided with a slide-way $6^f$ to coöperate with the slide-way $2^f$ of the section 2. The plate 6 which is secured to the shoe has an upright $7^a$, and the upright $7^a$ has a slide-way $7^b$ to coöperate with the slide-way $2^e$ of the section 2 and in order to form a closure plate over the top of the slide-ways, I provide a plate 9 interlocked at $9^a$ with the section 2, and at $9^b$ with the upright $7^a$ and the plate 9 has a foot $9^c$ which is bolted to the member 2 and the upright supporting bar 3, as shown in the drawings.

8 designates the horizontal finger bar which is provided with the usual fingers $8^a$ and with which the horizontal reciprocal sickle bar $8^b$ coöperates and the horizontally reciprocal sickle bar $8^b$ carries the cutter knives $8^c$ which may be of the usual type.

The vertically slidable block 5 is held at an incline to the horizontal, and provided with vertical grooves $5^a$ to coöperate with the slides $2^e$, $2^f$, $6^f$, $7^b$, and it is also provided with a T-groove extended longitudinally through the same at an angle to the horizontal, and in this T-groove the incline sliding member 10 operates. The member 10 comprises the sliding bearing member $10^a$ carried by the web $10^b$, which is formed integrally with the securing bar $10^c$ that is securely riveted or otherwise fastened to the horizontal sickle bar, so that as the horizontal sickle bar is reciprocated, the block 5 will be moved vertically accordingly.

In order to hold the securing bar 10ᶜ and the sickle bar from riding up, I provide a plate 11 which is bolted to the foot 6ᶜ, of the plate 6, and has a portion 11ᵃ that projects over the securing bar 10ᶜ beneath the block 5.

The block 5 is provided on its grooved face with a bearing plate 5ˣ that is removably secured in place by bolts 5ʸ and adjustable to take up excess play and wear by means of set screws 5ʳ and check nuts 5ˢ to coöperate therewith as clearly shown in Figs. 2 and 5, of the drawings.

The vertical reciprocating bar 12 reciprocates in the slideway 12ᵃ of the vertically held supporting bar 3 and carries the knives 13 and 14, as shown. The knives 14, three in number, are formed in one plate 14ᵃ, which is riveted or otherwise securely fastened to the reciprocating vertical sickle bar 12, at its lower end and this plate is provided with a T-slot 14ᵇ to correspond and register with the T-groove in the block 5, as will be readily apparent by reference to the drawings.

The knives 13 may be made in separate sections, as shown and securely fastened to the sickle bar 12, and the sickle bar 12 with its knives is held in proper position by the ordinary finger plates 15, as shown.

In order to keep obstruction from the back of the slide, I provide a suitable guard 16 secured to the shoe at its forward end and bent into the shape shown in the drawings and fixedly secured at its other end by bolts as most clearly shown in Fig. 3 of the drawings.

In the practical application of my invention, as the horizontal sickle bar is reciprocated in the usual manner its motion will be directly imparted to the vertical sickle bar through the medium of the incline bearing member carried by the horizontal sickle bar and the slide 5, which it should be stated, is fixedly secured to the vertical sickle bar by a bracket member 5ᵐ as shown, and it may be also securely riveted to the plate 14ᵃ of the knife 14, if so desired.

In the practical application of my apparatus, the horizontal guards and knives will have a stroke of about three inches, while the upright cutter will have a stroke of about one and three-fourths inches as I find from practical experience this arrangement to be preferable.

From the foregoing description taken in connection with the accompanying drawings it is thought the complete construction, advantages and operation of my invention will be readily understood by those skilled in the art to which the invention appertains, and it will be noticed that reciprocal motion of the main or horizontal sickle bar being imparted to the incline bearing member carried thereby, which moves with the main sickle bar as an integral part thereof, that by reason of the peculiar connection between such member and the vertically sliding bearing member 5, the said member 5 will be moved up and down as the main cutter bar operates in the usual manner and thereby impart a similar reciprocal motion to the vertical cutter bar in like character to that of the horizontal cutter bar, and hence a positive uniform coöperation of the two cutter bars is effected without the lost motion incident in mechanisms in which the transmitted devices include toggle or link members.

My improved attachments are of such character as to not require any material change in the sickle bar, cutter and shoe construction, and can be, when desired, readily removed from the main mowing machine.

The construction shown in the accompanying drawings illustrates the general arrangement of my invention, and when desired, it should be understood, that slight changes in the detail arrangement and construction of the several parts may be made without departing from the scope of the appended claims.

What I claim is,—

1. The combination with a horizontal cutting mechanism including the reciprocally movable horizontal sickle bar, the standard projected from the shoe end of the said mechanism, and a supplemental cutter mechanism including the vertically reciprocal sickle bar, a vertically slidable block secured to the vertically reciprocal sickle bar, and having a slide bearing groove inclined outward and downward and a corresponding inclined bearing member coöperating therewith and secured to the horizontal sickle bar, substantially as shown and described.

2. In an apparatus of the class described, the combination with a main cutting mechanism and a supplemental cutting mechanism held substantially at right angles thereto, of means for imparting the motion of the main cutting mechanism to the supplemental cutting mechanism, said means comprising a slideway, a block slidable therein, and secured to the sickle bar of the supplemental cutting mechanism, said block having a groove inclined outward and downward, and a corresponding inclined bearing member secured to the sickle bar of the main cutting mechanism and coöperating with the inclined groove in said block, substantially as shown and described.

3. In an apparatus of the class described, the combination with a main cutting mechanism and a supplemental cutting mechanism held substantially at right angles thereto, of means for imparting the motion of the main cutting mechanism to the supplemental cutting mechanism, said means comprising a slideway, a block slidable therein, and secured to the sickle bar of the supplemental cutting mechanism, said block having a groove inclined outward and downward and a corresponding inclined bearing member secured to the sickle bar of the main cutting mechanism and coöperating with the inclined groove in said block, and a guard plate held over said reciprocating block, substantially as shown and described.

4. In an apparatus of the class described, the combination with a main cutting mechanism and a supplemental cutting mechanism held substantially at right angles thereto, of means for imparting the motion of the main cutting mechanism to the supplemental cutting mechanism, said means comprising a slide-way, a block slidable therein and secured to the sickle bar of the supplemental cutting mechanism, said block having a portion inclined outward and downward, a corresponding inclined bearing member secured to the sickle bar of the main cutting mechanism and coöperating with the inclined portion of said block, a guard plate held over said reciprocating block, and a fixedly held guard member secured to the shoe of said main cutting mechanism, substantially as shown and described.

5. An apparatus of the class described, a shoe, a main cutting mechanism including guard fingers and a reciprocating sickle bar, said main cutting mechanism being secured to said shoe, a supplemental cutting mechanism secured to said shoe and held in a different plane from that containing the main cutting mechanism, said supplemental cutting mechanism comprising a guard carrying support and a supplemental sickle bar reciprocably held therein, knives carried by said supplemental sickle bar, said knives including a section formed of a plate with a plurality of integrally formed knives, said section being secured at the lower end of the supplemental sickle bar and having a T-slot, a sliding block secured to said supplemental sickle bar adjacent said section plate, and having a T-groove to merge with said T-slot, said block having its T-groove inclined outward and downward, slideways for said block, and means coöperating with the main sickle bar for reciprocating said block and said supplemental sickle bar.

6. An apparatus of the class described, a shoe, a main cutting mechanism including guard fingers and a reciprocating sickle bar, said main cutting mechanism being secured to said shoe, a supplemental cutting mechanism secured to said shoe and held in a different plane than that containing the main cutting mechanism, said supplemental cutting mechanism comprising a guard carrying support and a supplemental sickle bar reciprocably held therein, knives carried by said supplemental sickle bar, said knives including a section formed of a plate with a plurality of integrally formed knives, said section being secured at the lower end of the supplemental sickle bar and having a T-slot, a sliding block secured to said supplemental sickle bar and adjacent said section plate and having a T-groove to merge with said T-slot, said block having its T-groove inclined outward and downward, slideways for said block, means coöperating with said block and carried by the main sickle bar for reciprocating said block and said supplemental sickle bar, said last named means comprising an inclined member carried by the main sickle bar for entering the groove in said block to coöperate therewith.

7. An apparatus of the class described, a shoe, a main cutting mechanism including guard fingers and a reciprocating sickle bar, said main cutting mechanism being secured to said shoe, a supplemental cutting mechanism secured to said shoe and held in a different plane than that containing the main cutting mechanism, said supplemental cutting mechanism comprising a guard carrying support, and a supplemental sickle bar reciprocably held therein, knives carried by said supplemental sickle bar, said knives including a section formed of a plate with a plurality of integrally formed knives, said section being secured at the lower end of the supplemental sickle bar and having a T-slot, a sliding block secured to said supplemental sickle bar and adjacent said section plate and having a T-groove to merge with said T-slot, said block having its T-groove inclined outward and downward, slideways for the block, means coöperating with said block and carried by the main sickle bar for reciprocating said block and said supplemental sickle bar, said last named means comprising an inclined member carried by the main sickle bar for entering the groove in said block to coöperate therewith, said block having a wear-plate removably held in said T-groove.

8. An apparatus of the class described, a shoe, a main cutting mechanism including guard fingers and a reciprocating sickle bar, said main cutting mechanism being secured to said shoe, a supplemental cutting mechanism secured to said shoe and held in a different plane than that containing the main cutting mechanism, said supplemental cutting mechanism comprising a guard carrying support, and a supplemental sickle bar reciprocably held therein, knives carried by said supplemental sickle bar, said knives including a section formed of a plate with a plurality of integrally formed knives, said section being secured at the lower end of the supplemental sickle bar and having a T-slot, a sliding block secured to said supplemental sickle bar and adjacent said section plate, and having a T-groove to merge with said T-slot, said block having its T-groove held inclined to the horizontal, slideways for said block, means coöperating with said block and carried by the main sickle bar for reciprocating said block and said supplemental sickle bar, said last named means comprising an inclined member carried by the main sickle bar for entering the groove in said block to coöperate therewith, said block having a wear-plate removably held in said T-groove, and means for adjustably holding said wear-plate in said groove.

9. An apparatus of the class described, the combination with a shoe, a main cutting mechanism secured thereto, a supplemental cutting mechanism secured to said shoe, and held in a different plane than that containing the main cutting mechanism, said supplemental cutting mechanism including guard fingers, a supplemental guard finger section having a plurality of fingers integrally formed therewith and having portions for interlocking with said shoe, said supplemental cutting mechanism including a standard or support, means for securing said supplemental finger section to said support, and means for operating the supplemental cutting mechanism directly from the main cutting mechanism, substantially as shown and described.

10. An apparatus of the class described, the combination with a shoe, a main cutting mechanism secured thereto, a supplemental cutting mechanism secured to said shoe, and held in a different plane than that containing the main cutting mechanism, said supplemental cutting mechanism including guard fingers, a supplemental guard finger section having a plurality of fingers integrally formed therewith and having portions for interlocking with said shoe, said supplemental cutting mechanism including a standard or support, means for securing said supplemental finger section to said support, means for operating the supplemental cutting section directly from the main cutting mechanism, said last named means comprising an inclined member carried by one of said cutting mechanisms, and a slide block carried by the other cutting mechanism, said slide block having a groove inclined outward and downward to coöperate with said inclined member, substantially as shown and described.

11. An apparatus of the class described, the combination with a shoe, a main cutting mechanism secured thereto, a supplemental cutting mechanism secured to said shoe and held in a different plane than that containing the main cutting mechanism, said supplemental cutting mechanism including guard fingers, a supplemental guard finger section having a plurality of fingers, integrally formed therewith and having portions for interlocking with said shoe, said supplemental cutting mechanism including a standard or support, means for securing said supplemental finger section to said support, means for operating the supplemental cutting section directly from the main cutting mechanism, said last named means comprising a member inclined downward and outward carried by one of said cutting mechanisms, a slide block carried by the other cutting mechanism, said slide block having a groove inclined downward and outward to coöperate with said inclined member, and slideways for said slide blocks, substantially as shown and described.

HENRY P. JOHNSON.

Witnesses:
JOHN O. KEEPERS,
CHESTER G. KELLY.